US010375182B2

(12) United States Patent
Meier

(10) Patent No.: US 10,375,182 B2
(45) Date of Patent: Aug. 6, 2019

(54) METHODS, SYSTEMS, AND MEDIA FOR MANAGING WIND SPEED DATA

(71) Applicant: Bradley I. Meier, Golden Beach, FL (US)

(72) Inventor: Bradley I. Meier, Golden Beach, FL (US)

(73) Assignee: New Paradigm Group, LLC, Fort Lauderdale, FL (US)

( * ) Notice: Subject to any disclaimer, the term of this patent is extended or adjusted under 35 U.S.C. 154(b) by 359 days.

(21) Appl. No.: 15/285,762

(22) Filed: Oct. 5, 2016

(65) Prior Publication Data

US 2017/0104648 A1 Apr. 13, 2017

Related U.S. Application Data

(60) Provisional application No. 62/239,072, filed on Oct. 8, 2015.

(51) Int. Cl.
*H04L 29/08* (2006.01)
*H04W 4/80* (2018.01)
*H04L 29/06* (2006.01)

(52) U.S. Cl.
CPC .............. *H04L 67/20* (2013.01); *H04L 67/10* (2013.01); *H04L 67/18* (2013.01); *H04L 67/2823* (2013.01); *H04W 4/80* (2018.02); *H04L 67/42* (2013.01)

(58) Field of Classification Search
CPC ..................................................... H04L 67/20
See application file for complete search history.

(56) References Cited

U.S. PATENT DOCUMENTS

| 6,952,648 | B1 | 10/2005 | Menard et al. | |
|---|---|---|---|---|
| 7,114,388 | B1 | 10/2006 | French et al. | |
| 7,774,139 | B1 | 8/2010 | Rose et al. | |
| 2002/0029111 | A1* | 3/2002 | Peek | G01W 1/10 702/3 |
| 2005/0108150 | A1 | 5/2005 | Pethick et al. | |
| 2011/0226051 | A1* | 9/2011 | Al-Wehebi | G01P 5/04 73/170.06 |

(Continued)

OTHER PUBLICATIONS

Patent Cooperation Treaty: PCT Application No. PCT/US2016/055697: International Search Report and Written Opinion; 20 pages; Feb. 5, 2017; Young, Lee W.

*Primary Examiner* — Suraj M Joshi

(57) ABSTRACT

A system for collecting and managing wind speed data via an external communications network comprises one or more wind stations, each including an anemometer producing wind speed signals, a station computing device converting the signals to wind speed data, a station memory securely storing the wind speed data on site and a station communication interface transmitting the wind speed data onto an external network. The system further comprises one or more data servers, each including a server computing device, a server communication interface receiving the wind speed data from the wind stations and a server memory storing the received wind speed data. The data server can determine if the received wind speed data satisfies predetermined conditions for certification and/or triggering a payout in accordance with a contract, and can thereafter transmit the appropriate data signals to another location on the external communications network.

6 Claims, 5 Drawing Sheets

(56) References Cited

U.S. PATENT DOCUMENTS

| | | | |
|---|---|---|---|
| 2014/0032704 A1* | 1/2014 | Painter | G08B 27/006 709/217 |
| 2014/0324348 A1* | 10/2014 | Volfson | G01W 1/02 702/3 |
| 2015/0159337 A1 | 6/2015 | Kellner | |
| 2018/0075537 A1 | 3/2018 | Kaplan et al. | |

* cited by examiner

METHODS, SYSTEMS, AND MEDIA FOR MANAGING WIND SPEED DATA

CROSS-REFERENCE TO RELATED APPLICATIONS

This application claims benefit of U.S. Provisional Application No. 62/239,072, filed Oct. 8, 2015, entitled METHODS, SYSTEMS, AND MEDIA FOR MANAGING WIND SPEED DATA, the specification of which is incorporated herein in its entirety.

TECHNICAL FIELD

The disclosed subject matter relates to methods, systems, and media for managing wind speed data.

BACKGROUND

Devices such as anemometers for the measurement of wind speeds are known, and devices for recording wind speed data are also know. Recorded wind speed data from such devices may be valuable for resolving insurance claims resulting from storm damage. However, during severe weather, or in the aftermath of severe storms, the recording of wind speeds may be interrupted and/or the recorded wind speed data may be lost due to physical damage, lightning strikes, water intrusion, power loss, looting, vandalism or other causes adversely affecting the wind speed measurement and recording devices and/or the media upon which the wind speed data is stored. A need therefore exists, for methods, systems and media for managing wind speed data that are more resistant to damage, interruption and/or data loss during and after severe weather.

Even when recorded wind speed data remains intact, following a severe storm it may be difficult to obtain access to the locations where the recorded wind speed data is stored. This can result in delays in obtaining recorded wind speed data, which in turn can delay the resolution of insurance claims resulting from storm damage. A need therefore exists, for methods, systems and media for managing wind speed data that can transfer the wind speed data in a timely manner from the associated wind measurement stations to remote locations where the data can be evaluated. A need further exists, for methods, systems and media for managing wind speed data that can evaluate wind speed data to determine if certification of the wind speed data is indicated and/or to determine if payment under a contract is indicated.

SUMMARY

In some embodiments a wind speed data system can gather wind speed data from an anemometer located at a wind speed station, store the wind speed data on a storage device located at the wind speed station, and transmit the wind speed data to a data server such that the wind speed data can be stored redundantly and protected from data loss resulting from storms or other causes of data loss.

In some other embodiments, a storage device located at the wind speed station can be protected within a housing located below ground. For example, the storage device can be protected by a waterproof, damage resistant housing that can detach from the other components of the wind station in the event of damage being caused to the wind station by excessive wind speeds or other forces.

In still other embodiments, the gathered wind speed data can be used to create a wind speed damage model such that whenever excessive wind speeds are detected at a wind station, an amount of property damage can be estimated based on the wind speeds detected and the wind speed damage model.

In another aspect, a wind station system for collecting and managing wind speed data at a geographic location having a ground level is provided, the system comprising a wind-resistant pole disposed at the geographic location, the pole having a base portion disposed below the ground level and a riser portion extending upward from the base portion. An anemometer is mounted on the riser portion of the pole above the ground level, the anemometer producing wind speed signals indicative of wind speed at the anemometer. A computing device is operatively connected to the anemometer for the receiving the wind speed signals from the anemometer and producing wind speed data corresponding to the received wind speed signals. A housing is disposed at the geographic location but physically separated from both the pole and the anemometer and a storage device is disposed inside the housing and operatively connected to the computing device for receiving wind speed data from the computing device and storing the wind speed data.

In one embodiment, the housing containing the storage device is waterproof and disposed below the ground level.

In another embodiment, the wind station system further comprises an electrical storage battery disposed at the geographic location and operatively connected to at least one of the anemometer, computing device and storage device for supplying electrical power thereto, and a photovoltaic solar panel disposed at the geographic location and operatively connected to the storage battery for charging the storage battery with electrical power.

In yet another embodiment, the operatively connecting between the computing device and the storage device for communication of the wind speed data from the computing device to the storage device is accomplished by a wireless connection.

In a further embodiment, the wireless connection for communication of the wind speed data from the computing device to the storage device is one of cellular mobile device network, Bluetooth, Wi-Fi and near field communication.

In a still further embodiment, the computing device further comprises a communication interface adapted to transmit wind speed data from the storage device to another location using an external communication network.

In another embodiment, the storage device includes a memory for storing the wind speed data, and the memory is at least one of a random access memory, a read-only memory, a flash memory, a hard disk drive, a solid-state drive, a removable memory card, a removable USB memory stick, and an optical drive and optical media.

In another aspect, a system for collecting and managing wind speed data via an external communications network is provided. The system comprises one or more wind station, each respective wind station being disposed at a respective wind station location and including, respectively, an anemometer disposed at the respective wind station location and producing wind speed signals indicative of wind speeds at the respective wind station location, a station computing device disposed at the respective wind station location and operatively connected to the anemometer for receiving the wind speed signals and producing wind speed data corresponding to the wind speed signals, a station memory disposed at the respective wind station location and operatively connected to the station computing device for storing the wind speed data, and a station communication interface disposed at the respective wind station location, the station communication interface being operatively connected to the station computing device to receive wind speed data therefrom, and being operatively connected to an external communication network to the transmit wind speed data to the external communications network. The system further comprises one or more data server, each respective data server being disposed at a respective data server location and including, respectively, a server computing device disposed at the respective data server location, a server communication interface disposed at the respective data server location, the server communication interface being operatively connected to the external communication network to receive respective wind speed data from the one or more wind stations and operatively connected to the server computing device to provide the received respective wind speed data to the server computing device, and a server memory disposed at the respective data server location and operatively connected to the server computing device for storing the received respective wind speed data. The one or more data server can transmit the stored received respective wind speed data to another location on the external communications network.

In one embodiment, the one or more wind station are further adapted to store a plurality of respective individual anemometer readings in the respective station memory over a predetermined time period, to convert the plurality the respective individual anemometer readings over the predetermined time period into a respective average wind speed for the predetermined time period, and to transmit the respective average wind speed for the predetermined time period to the one or more data server over the external communications network.

In another embodiment, the one or more wind station are further adapted to store a plurality of respective individual anemometer readings in the respective station memory over a predetermined time period, to convert the plurality the respective individual anemometer readings over the predetermined time period into a respective maximum wind speed for the predetermined time period, and to transmit the respective maximum wind speed for the predetermined time period to the one or more data server over the external communications network.

In yet another embodiment, the system further comprises one or more certification server, each respective certification server being disposed at a respective certification server location and including, respectively, a certification server computing device disposed at the respective certification server location and a certification server communication interface disposed at the respective certification server location, the certification server communication interface being operatively connected to the external communication network to receive respective wind speed data from the one or more data servers and operatively connected to the certification server computing device to provide the received respective wind speed data to the certification server computing device. Each of the one or more certification server can generate a respective data model, the respective data model comprising at least one of a historical storm model and a wind speed damage model. Each of the one or more certification server can generate a respective certification report based on the received respective wind speed data and the generated respective data models. The one or more certification server can transmit the generated respective certification report to another location on the external communications network.

In a further embodiment, the system further comprises one or more payout server, each respective payout server being disposed at a respective payout server location and including, respectively, a payout server computing device disposed at the respective payout server location and a payout server communication interface disposed at the respective payout server location, the payout server communication interface being operatively connected to the external communication network to receive the respective certification reports from the one or more certification server and to provide the received respective certification reports to the payout server computing device. Each of the one or more payout server can determine if a received respective certification report satisfied the terms of a respective associated contract.

In a still further embodiment, each of the one or more payout server, upon determining that the received respective certification report satisfies the terms of the respective associated contract, triggers a respective payout in accordance with the respective associated contract at another location by communicating over the external communication network.

In yet another aspect, a method for collecting and managing wind speed data is provided. The method comprises measuring wind speeds at a one or more geographic location and producing respective wind speed signals indicative of the respective measured wind speeds at each respective one or more geographic location, wherein the respective wind speed signals are one of electric signals and electronic signals. The method further comprises converting respective wind speed signals into respective wind speed data at each respective one or more geographic location, wherein the respective wind speed data is digital data, storing the respective wind speed data at each respective one or more geographic location, wherein the respective wind speed data is stored in a digital data format, and transmitting the respective stored wind speed data at each respective one or more geographic location as digital data onto an external communications network. The method further comprises receiving, at one or more data server, the respective wind speed data as digital data for the respective one or more geographic location from the external communication network, storing the received respective wind speed data for the respective one or more geographic location on the one or more data server and determining, at the one or more data server, if the respective one or more wind speed data for each of the respective one or more geographic location are to be sent for certification. When it is determined that the one or more respective wind speed data for the respective one or more geographic location are to be sent for certification, the method further comprises transmitting the respective one or more wind speed data for the respective one or more geographic location as digital data onto an external communications network and receiving, at one or more certification server, the respective wind speed data for the respective one or more geographic location as digital data from the external communication network.

In one embodiment, the method further comprises storing a plurality of the respective wind speed data for a particular one of the one or more geographic location over a predetermined time period, converting the stored plurality of the respective wind speed data for the particular one of the one or more geographic location over the predetermined time period into at least one of an average wind speed for the predetermined time period at the particular one of the one or more geographic location, and a maximum wind speed for the predetermined time period at the particular one of the one or more geographic location, and determining, for the predetermined time period at the particular one of the one or more geographic locations, if the respective average wind speed or maximum wind speed exceeds a predetermined threshold for the respective average wind speed or maximum wind speed. When it is determined that the respective average wind speed or maximum wind speed exceeded a predetermined threshold for the respective average wind speed or maximum wind speed, the method further comprises transmitting and alert signal as digital data to a user device using the external communications network.

In another embodiment, the method further comprises generating, in response to receiving at the one or more certification server the respective wind speed data for the respective one or more geographic location from the external communication network, at least one of a historical storm model and a wind speed damage model, generating a certification report for the respective one or more geographic location based on both the respective wind speed data for the respective one or more geographic location and the at least one of generated historical storm model and wind speed damage model and transmitting the certification report for the respective one or more geographic location as digital data onto the external communications network.

In yet another embodiment, the method further comprises determining, in response to receiving the certification report for the respective one or more geographic location from the external communication network, whether the terms of an associated contract are satisfied. When it is determined in response to receiving the certification report that the terms of an associated contract are satisfied, the method further comprises triggering a payout in accordance with the associated contract by communicating digital data onto the external communications network.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1A shows an enlarged view of an anemometer suitable for use in some embodiments of the wind station system of FIG. 1;

DETAILED DESCRIPTION

In accordance with various embodiments of the disclosed subject matter, mechanisms (which can include methods, systems, and media) for managing wind speed data are described herein.

Figure 1:
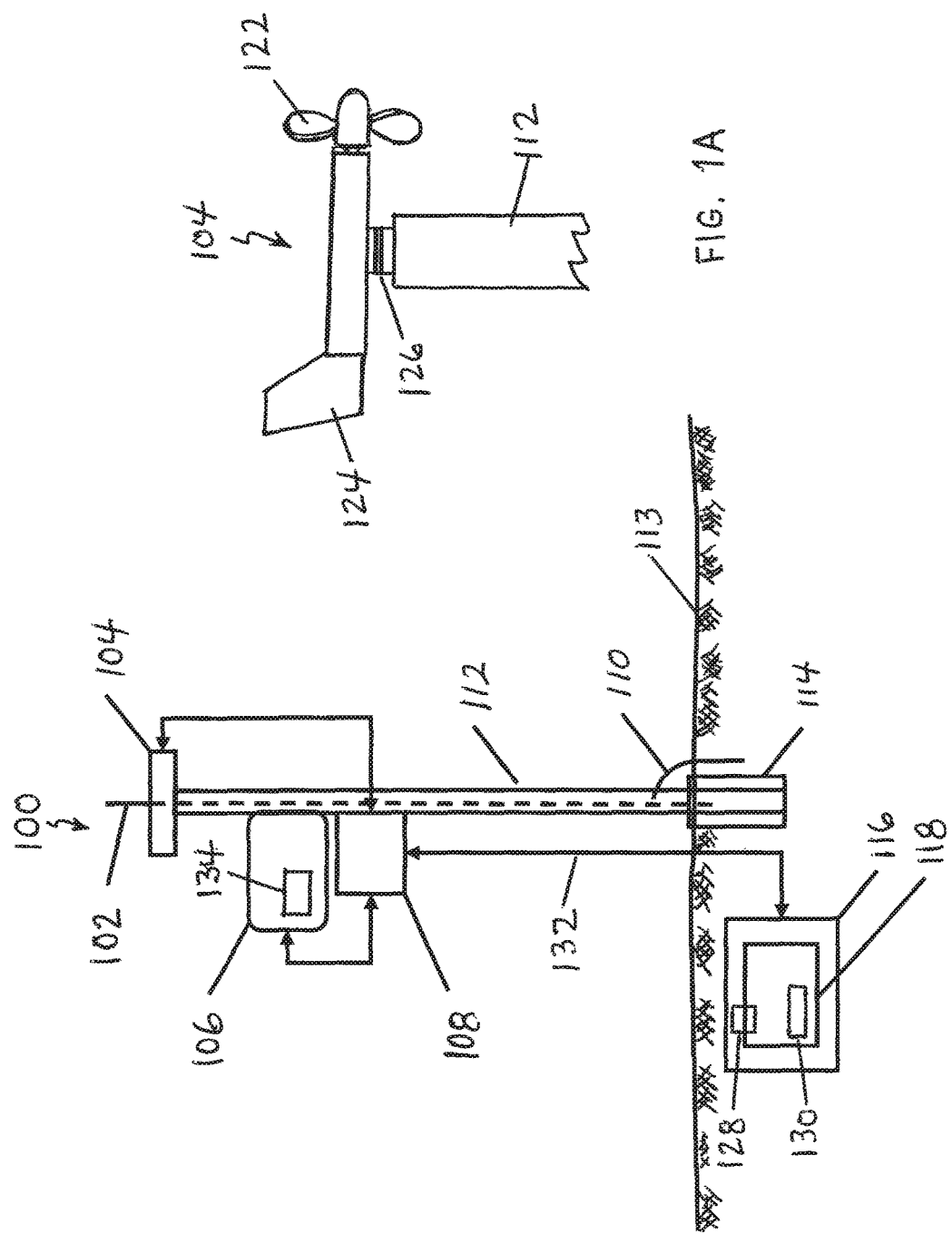
FIG. 1 shows an example of a wind station system for managing wind speed data in accordance with some embodiments of the disclosed subject matter.

Referring now FIG. 1, there is illustrated an example of a wind station system 100 for managing wind speed data in accordance with some embodiments of the disclosed subject matter. In some embodiments, the wind station system 100 is disposed at a particular geographic location and manages wind speed data for winds occurring at the particular geographic location. As shown, in some embodiments, system 100 can include a lightning terminal 102, an anemometer 104, a solar panel 106, a computing device 108, a ground wire 110, a pole 112, a pole foundation 114, a housing 116 and a storage device 118. In some embodiments, all of these elements can be disposed at the particular geographic location, whereas in other embodiments, some of the elements may be disposed at different geographic locations. It should be understood that although only one of each of these elements is shown in FIG. 1, more than one of each of these elements can be used in some embodiments.

In some embodiments, any lightning terminal 102 suitable for conducting the electric charge of a lightning strike away from other components can be used. For example, the lighting terminal 102 can comprise an electrically conductible rod, an electrically conductible wire, and/or any other electrically conductible part or assembly of parts.

In some embodiments, the lightning terminal 102 can be connected to the ground wire 110 such that in the event of a lightning strike, the electric charge will be grounded to the earth 120. In some embodiments, any suitable ground wire 110 can be used. For example, the ground wire 110 can be a copper wire, a shielded wire, an insulated wire and/or any other type of wire suitable for grounding an electric charge.

In some embodiments, the ground wire 110 can be inserted at any suitable depth into the earth 120. For example, a ground wire 110 can be inserted into the earth 120 to a depth of 20 feet below the ground level 113 (i.e., surface) at the location.

Referring still to FIG. 1, and now also to FIG. 1A, in some embodiments, any anemometer 104 suitable for measuring wind speeds can be used. For example, referring now specifically to FIG. 1A, in the illustrated embodiment the anemometer 104 may include a propeller 122. In some such embodiments, the anemometer 104 can produce an electrical signal when the propeller 122 is rotated by wind. In a more particular example, the propeller 122 can produce an AC sine wave electrical signal. In another more particular example, the propeller 122 can be configured to produce an electrical signal directly proportional to wind speed. The anemometer 104 may further include a tail assembly 124 and a swivel bearing 126 rotatably connected to the pole 112, whereby the action of the wind on the tail assembly causes the anemometer to rotate horizontally on the swivel bearing to keep the propeller 122 facing into the wind. In some embodiments, the anemometer 104 can be implemented without a propeller using other moving apparatus, for example, moving cups, vanes, rotors and/or with non-moving apparatus, for example, a pitot tube assembly, to measure the wind speed. In other embodiments, the anemometer 104 can produce electrical signals (e.g., analog voltage, current, frequency or phase signals) or electronic signals (e.g., digital electric signals) proportional to the measured wind speed and/or indicative of the measured wind speed at the anemometer's geographic location.

Figure 3:
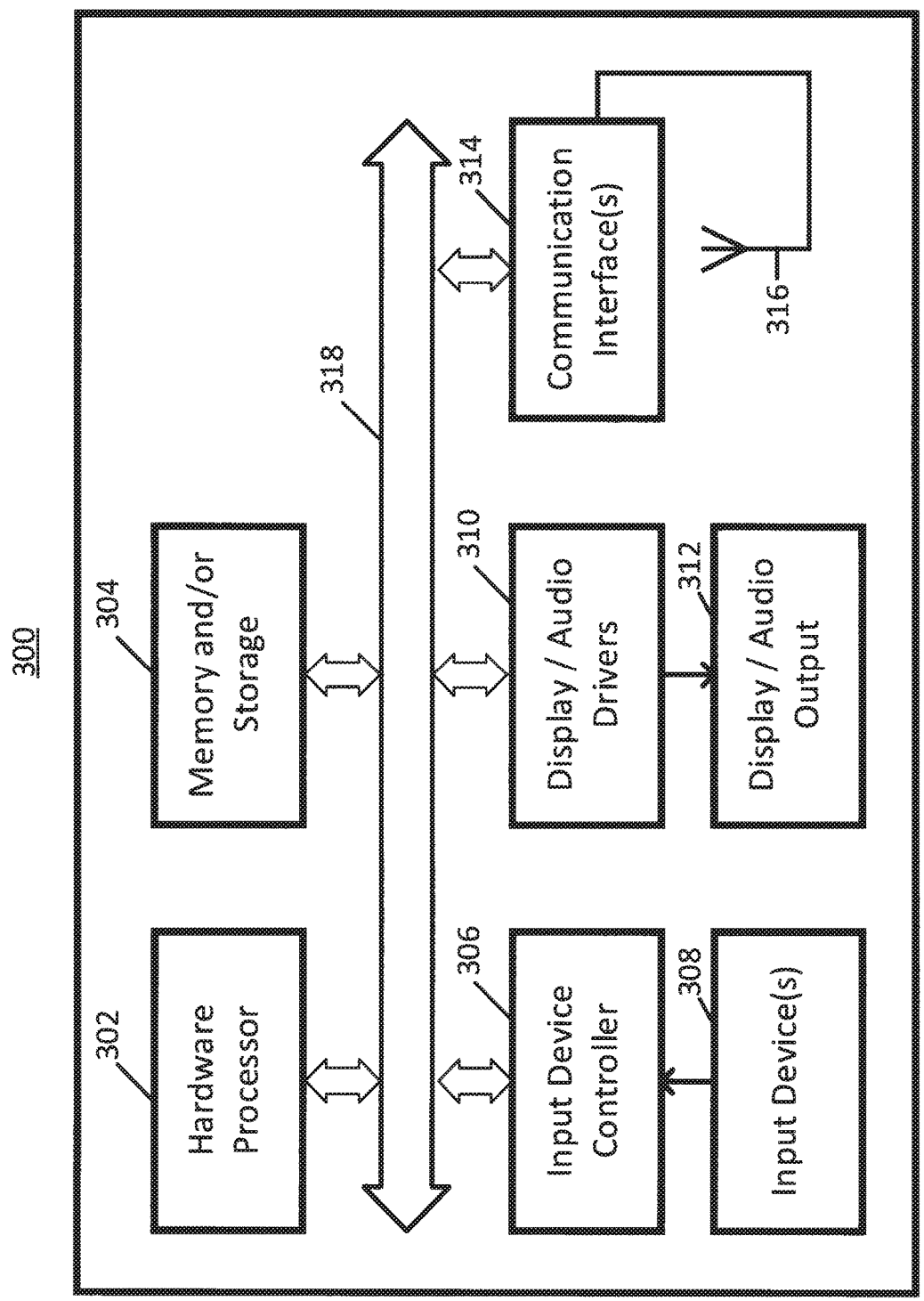
FIG. 3 shows an example of hardware implemented as a computing device in accordance with some embodiments of the disclosed subject matter.

Referring now to FIG. 3, there is illustrated one example of computer hardware 300 implemented as the computing device 108 in accordance with one embodiment. In some other embodiments, any suitable computing device 108 can be used. As illustrated in FIG. 3, the computer hardware 300 can include a hardware processor 302, a memory and/or storage 304, an input device controller 306, an input device 308, display/audio drivers 310, display and audio output circuitry 312, a communication interface(s) 314, an antenna 316 and a bus 318.

The hardware processor 302 can include any suitable hardware processor, such as a microprocessor, a microcontroller, digital signal processor(s), dedicated logic, and/or any other suitable circuitry for controlling the functioning of a general purpose computer or a special purpose computer in some embodiments. In some embodiments, the hardware processor 302 can be controlled by a program stored in the memory and/or storage 304. For example, the program can cause the hardware processor 302 to perform the mechanisms and/or processes described herein for managing wind speed data, and/or perform any other suitable actions.

The memory and/or storage 304 can be any suitable memory and/or storage for storing application information, programs, data, and/or any other suitable information in some embodiments. For example, the memory and/or storage 304 can include random access memory ("RAM"), read-only memory ("ROM"), flash memory, hard disk storage, optical media and/or any other suitable memory.

The input device controller 306 can be any suitable circuitry for controlling and receiving input from one or more input devices 308 in some embodiments. For example, the input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, from a wind speed sensor (e.g., the anemometer 104 of FIG. 1) and/or from any other type of input device.

The display/audio drivers 310 can be any suitable circuitry for controlling and driving output to one or more display/audio output devices 312 in some embodiments. For example, the display/audio drivers 310 can be circuitry for driving a touchscreen, a flat-panel display, a cathode ray tube display, a projector, a speaker or speakers and/or any other suitable display and/or presentation devices.

The communication interface(s) 314 can be any suitable circuitry for interfacing with one or more communication networks, such as the communication network 210 shown in FIG. 2 and described below. For example, the interface(s) 314 can include network interface card circuitry, wireless communication circuitry and/or any other suitable type of communication network circuitry. The communication interface(s) 314 can also include circuitry for interfacing with external devices including the storage device 118 and/or the memory 130 for storing and/or retrieving wind speed data from the storage device and/or the memory. In some embodiments, the wind speed data can be stored in the storage device 118 and/or the memory 130 as digital data and/or can be transmitted to, or received from, the communication network 210 as digital data.

The antenna 316 can be any of one or more suitable antennas for wirelessly communicating with a communication network (e.g., the communication network 210 of FIG. 2 as described below) in some embodiments. In some embodiments, the antenna 316 can be omitted.

The bus 318 can be any suitable mechanism for communicating between two or more components 302, 304, 306, 310 and 314 in some embodiments. The communication between the components of the computer hardware 300 along the data bus 318 can be implemented as digital data.

Any other suitable components can be included in hardware 300 in accordance with some embodiments.

Referring again to FIG. 1, the pole 112 can include a base portion disposed below the surface of the ground (i.e., below the ground level 113) and a riser portion extending upward from the base portion. In some embodiments, the base portion of the pole 112 can be supported by a pole foundation 114. Any suitable pole foundation 114 can be used in some embodiments. For example, the pole foundation 114 can be implemented as stone (e.g., FDOT #57 stone) backfilled about the pole 112. In some embodiments, the pole 112 may be a concrete pole or a steel pole.

In some embodiments, the pole foundation 114 can be configured such that the pole 112 can sustain wind speeds of one hundred sixty miles per hour. For example, the pole foundation 114 can comprise a two and one-half foot diameter cylinder extending fourteen feet underground (i.e., below the surface of the ground) and configured such that the pole 11 above a one foot layer of the foundation material.

In some embodiments, the housing 116 for the storage device 118 can be implemented as any housing suitable for underground containment. For example, the housing 116 can include any suitable waterproof material, or combination of waterproof materials such as rubber, polyvinyl chloride (PVC), polyurethane, silicone rubber, and/or any other suitable waterproof material. As another example, the housing 116 can include any suitable non-waterproof material coated with a waterproof material. As a more particular example, the housing 116 can include a concrete housing coated with a bitumen membrane, a PVC membrane, a liquid rubber coating, an elastomeric coating, and/or any other coating material or method. As yet another example, the housing 116 can be any suitable safe (i.e., vault), which can be encased in cement to hold it in place. In preferred embodiments, the housing 116 is disposed below the ground level 113 to provide increased protection and security.

In some embodiments, the housing 116 can include a security device 128. For example, the housing 116 can include a safe/vault equipped with a locking device. As another example, the housing 116 can include a locking mechanism (e.g., a combination locking mechanism or a key locking mechanism).

In some embodiments, the housing 116 can contain any suitable storage device 118. For example, the storage device 118 can be any suitable memory 130 and/or storage for storing application information, programs, data and/or any other suitable information in some embodiments. The storage of the information, programs, data and/or other suitable information on the storage device 118 and/or the memory 130 can be implemented as digital data in any digital data format. As another example, the storage device 118 and memory 130 can include random access memory ("RAM"), read-only memory ("ROM"), flash memory, hard disk drive(s) ("MD"), solid-state drive(s) ("SSD"), memory card(s) (for example, but not limited to, "CompactFlash" cards, "SecureDigital" cards, "Memory Stick" cards), a removable USB memory stick, optical drives and optical media (for example, but not limited to, CD drives and CD discs, DVD drives and DVD discs, and Blu-ray drives and Blu-ray discs) and/or any other suitable memory.

In some embodiments, the storage device 118 can be configured inside the housing 116 such that the storage device can remain operable in the event of damage being caused to the above-ground components of the wind station 100. For example, the housing 116 can remain unattached to the pole 112 or pole foundation 114. In such an example, the memory 130 can include a wireless communication module, such as Bluetooth, near field communication radio, cellular mobile device network and/or any other wireless communication module suitable for allowing the memory to receive data (indicated in FIG. 1 by arrow 132) wirelessly from the computing device 108 and/or the anemometer 104. As another example, the memory 130 can be communicatively attached to the computing device 108, anemometer 104 and/or other components of the wind station 100 such that in the event of damage to the other components, the memory can be detached. As a more particular example, the memory 130 and/or the housing 116 can be attached to other components at least in part by a shear pin, the shear pin configured such that the memory and/or the housing can detach from the other components in the event that significant force (e.g., tensile force and/or shearing force is applied to the memory and/or the housing.

In some embodiments, any suitable solar panel configuration can be used for the solar panel 106. For example, the solar panel 106 can be mounted on the pole 112 such that the solar panel can detach from the pole and/or other components in the event of extreme winds. As another example, a solar panel 106 can be configured with a battery 134 operatively connected (indicated in FIG. 1 by arrows 136) to some or all of the other components (e.g., the anemometer 104, computing device 108 and/or storage device 118), such that the solar panel can provide power to the other components without interruption. As a more particular example, the solar panel 106 can be configured with a battery 134 such that the battery can store enough charge to power the other components for ten or more days.

Figure 2:
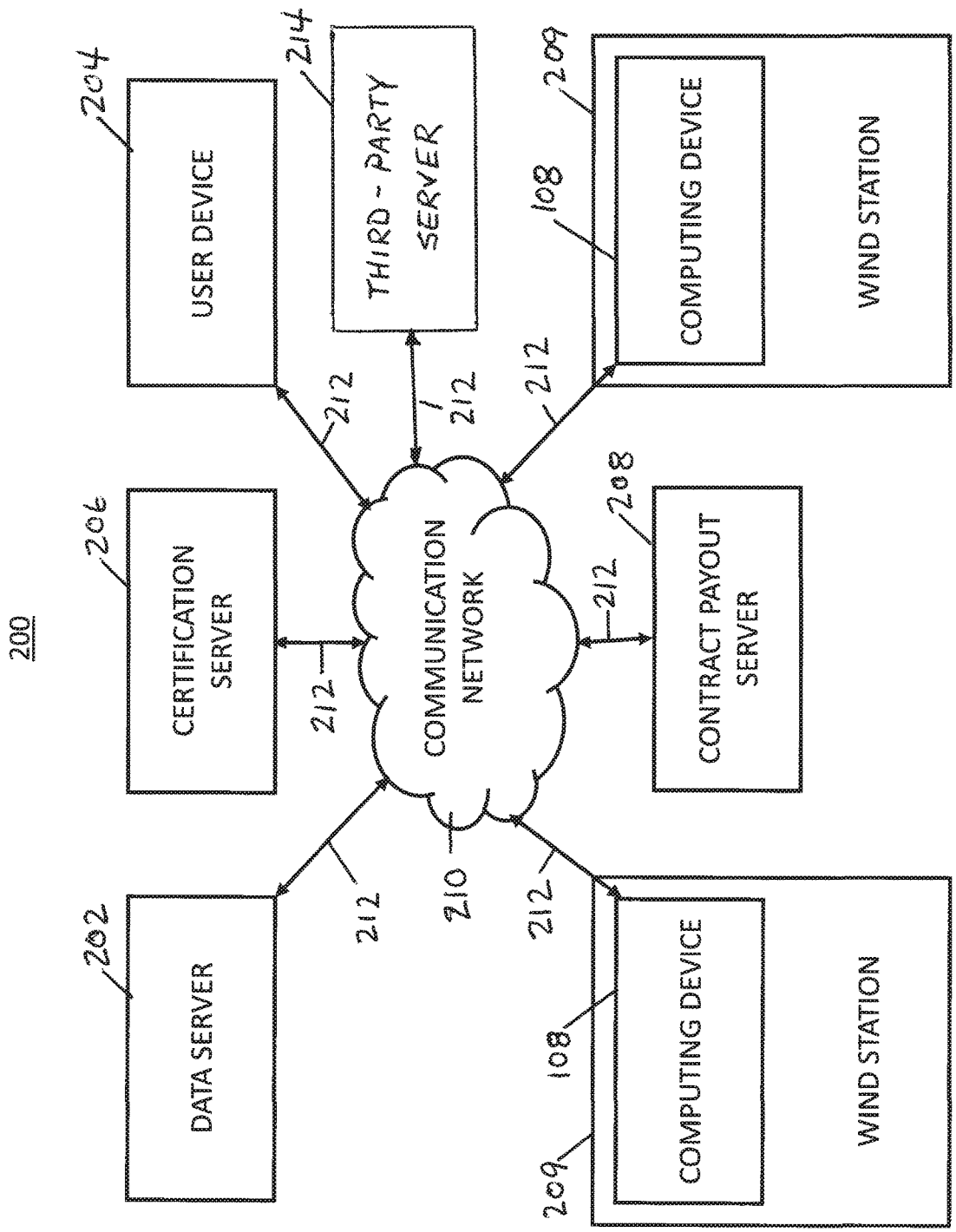
FIG. 2 shows an example of hardware for managing wind speed data that can be used in accordance with some embodiments of the disclosed subject matter.

Referring now to FIG. 2, there is illustrated one example of system hardware 200 for managing wind speed data that can be used in accordance with some embodiments of the disclosed subject matter. As illustrated, the system hardware 200 can include one or more: data servers 202, user devices 204, certification servers 206, contract payout servers 208 and wind stations 209 outfitted with computing devices 108.

In some embodiments, the wind station 209 can be any suitable wind station configured with a computing device 108. For example, as shown in FIG. 1, the wind station 209 can be the wind station system 100 disposed at a particular geographic location.

In some embodiments, the data server 202 can be any suitable server for storing data and/or delivering the data to a user device 204. In some embodiments, the data stored by the data server 202 and/or delivered to the user device 204 can be implemented as digital data in any digital data format. For example, the data server 202 can be a server that delivers data to a user device 204 and/or receives data from a wind station 209 via a communication network 210. In some embodiments, the data server 202 can include a server computing device, a server communication interface operatively connected to the communication network 210 to receive respective wind speed data from one or more wind stations 209 and operatively connected to the server computing device to provide the received respective wind speed data to the server computing device and a server memory disposed at the respective data server location and operatively connected to the server computing device for storing the received respective wind speed data. Data stored and/or delivered by the data server 202 can be any suitable data, such as wind speed data, wind direction data, historical weather data, contract data, contract payout data and/or any other suitable data. Data can be recorded and uploaded to the data server 202 by any suitable entity (e.g., a wind station computing device 108). In some embodiments, the data server 202 can be disposed at a geographic location that is remote from (i.e., geographically distant from) the wind station system 100, whereas in other embodiments, the data server can be disposed at the same geographic location as the wind station system. In some embodiments having more than one wind station system 100, each respective wind station system can be disposed at a different respective wind station location, and the data server 202 can be disposed at a data server location that is remote from at least one of the respective wind station locations. In some embodiments having more than one wind station system 100 and more than one data server 202, each respective wind station system can be disposed at a different respective wind station location, and each respective data server 202 can be disposed at a different respective data server location, wherein the respective wind station locations and data server locations are all geographically remote from one another. In some other embodiments, the data server 202 can be omitted.

The communication network 210 can be any suitable combination of one or more wired and/or wireless networks in some embodiments. For example, the communication network 210 can include anyone or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. The user device 204 can be connected by one or more communications links 212 to the communication network 210, which can be linked via one or more communications links to the data server 202, and/or wind stations 209. The communications links 212 can be any communications links suitable for communicating data among the user device 204, data server 202 and wind stations 209, such as network links, dial-up links, wireless links, hard-wired links, any other suitable communications links, or any suitable combination of such links. In some embodiments, the data communicated across the communication network 210 and/or communication links 212 can be implemented as digital data in any digital data format.

The user device 204 can include anyone or more user devices suitable for requesting data, searching for data, viewing data, retransmitting data, manipulating data, receiving a user input and/or any other suitable functions. For example, in some embodiments, the user device 204 can be implemented as a mobile device, such as a mobile phone, a tablet computer, a laptop computer and/or any other suitable mobile device. As another example, in some embodiments, the user device 204 can be implemented as a non-mobile device such as a desktop computer and/or any other suitable non-mobile device. In some embodiments, the user device 204 can be disposed at a geographic location that is remote from (i.e., geographically distant from) the wind station system 100 and/or the data server 202, whereas in other embodiments, the user device can be disposed at the same geographic location as the wind station system and/or the data server.

In some embodiments, the contract payout server 208 can be any suitable server for causing a contract to be paid out based on wind speed data. For example, the contract payout server 208 can be a server that receives wind speed data from a data server 202 via a communication network 210, and/or determines whether a contract should be paid out based on wind speed data and/or causes a third party server 214 to payout a contract by communicating with the third party server over a communication network 210. The storage of the wind speed data and other information, programs, data and/or other suitable information on the contract payout server 208 can be implemented as digital data in any digital data format. In some embodiments, the payout server 208 can include a payout server computing device, a payout server communication interface operatively connected to the communication network 210 to receive respective certification reports from one or more certification servers 206 and operatively connected to the payout server computing device to provide the received respective certification reports to the payout server computing device, and/or a payout server memory operatively connected to the payout server computing device for storing the received respective certification reports. In some embodiments, the payout server computing device can determine if a received respective certification report satisfied the terms of an associated contract, and if so, the payout server can trigger a payout at another location by communicating over the communication network 210. In some embodiments, the contract payout server 208 can be disposed at a geographic location that is remote from (i.e., geographically distant from) the wind station system 100, the data server 202 and/or the user device 204, whereas in other embodiments, the contract payout server can be disposed at the same geographic location as the wind station system the data server and/or the user device.

In some embodiments, the certification server 206 can be any suitable server for certifying wind speed data. For example, the certification server 206 can be a server that receives wind speed data from a data server 202 via a communication network 210, and/or stores historical wind speed data and/or determines whether wind speed data is accurate. The storage of the wind speed data and other information, programs, data and/or other suitable information on the certification server 206 can be implemented as digital data in any digital data format. In some embodiments, the certification server 206 can include a certification server computing device, a certification server communication interface operatively connected to the communication network 210 to receive respective wind speed data from one or more data servers 202 and operatively connected to the certification server computing device to provide the received respective wind speed data to the certification server computing device, and/or a certification server memory operatively connected to the certification server computing device for storing the received respective wind speed data. In some embodiments, the certification server computing device can generate a data model, for example a historical storm model or a wind speed damage model, and the generated data model can be transmitted by the certification server communication interface to another location on the communication network 210. In some embodiments, the certification server computing device can generate a certification report based on the received wind speed data and the generated data model, and the certification report can be transmitted by the certification server communication interface to another location on the communication network 210. In some embodiments, the certification server 206 can be disposed at a geographic location that is remote from (i.e., geographically distant from) the wind station system 100, the data server 202, the user device 204 and/or the contract payout server 208, whereas in other embodiments, the contract payout server can be disposed at the same geographic location as the wind station system, the data server, the user device and/or the contract payout server.

Although the data server 202 and the user device 204 are illustrated as separate devices in FIG. 2, the functions performed by the data server and the user device can be performed using any suitable number of devices in some embodiments. For example, in some embodiments, the functions performed by either the data server 202 or the user device 204 can be performed on a single device. As another example, in some embodiments, multiple devices can be used to implement the functions performed by the data server 202 and the user device 204.

Although the data server 202, certification server 206, and the contract payout server 208 are illustrated as separate devices in FIG. 2, the functions performed by the data server, certification server and the contract payout server can be performed using any suitable number of devices in some embodiments. For example, in some embodiments, the functions performed by either the data server 202, the certification server 206, or the contract payout server 208 can be performed on a single device. As another example, in some embodiments, multiple devices can be used to implement the functions performed by the data server 202, the certification server 206 and the contract payout server 208.

Although only two wind stations 209, one certification server 206, one contract payout server 208, one data server 202, one user device 204 and one third-party server 214 are shown in FIG. 2 to avoid over-complicating the figure, any suitable number and/or any suitable types of wind stations, data servers, user devices and third-party servers can be used in some embodiments.

The data server 202, the user device 204, and the wind station computing devices 108 can be implemented using any suitable hardware in some embodiments. For example, in some embodiments, the data server 202, the user device 204 and the wind station computing devices 108 can be implemented using any suitable general purpose computer or special purpose computer. For example, the wind station computing device 108 may be implemented using a special purpose computer. Any such general purpose computer or special purpose computer can include any suitable hardware. For example, referring again to FIG. 3, as illustrated in example computer hardware 300, such hardware can include a hardware processor 302, a memory and/or storage 304, an input device controller 306, an input device 308, display/audio drivers 310, display and audio output circuitry 312, a communication interface(s) 314, an antenna 316 and a bus 318.

Figure 4:
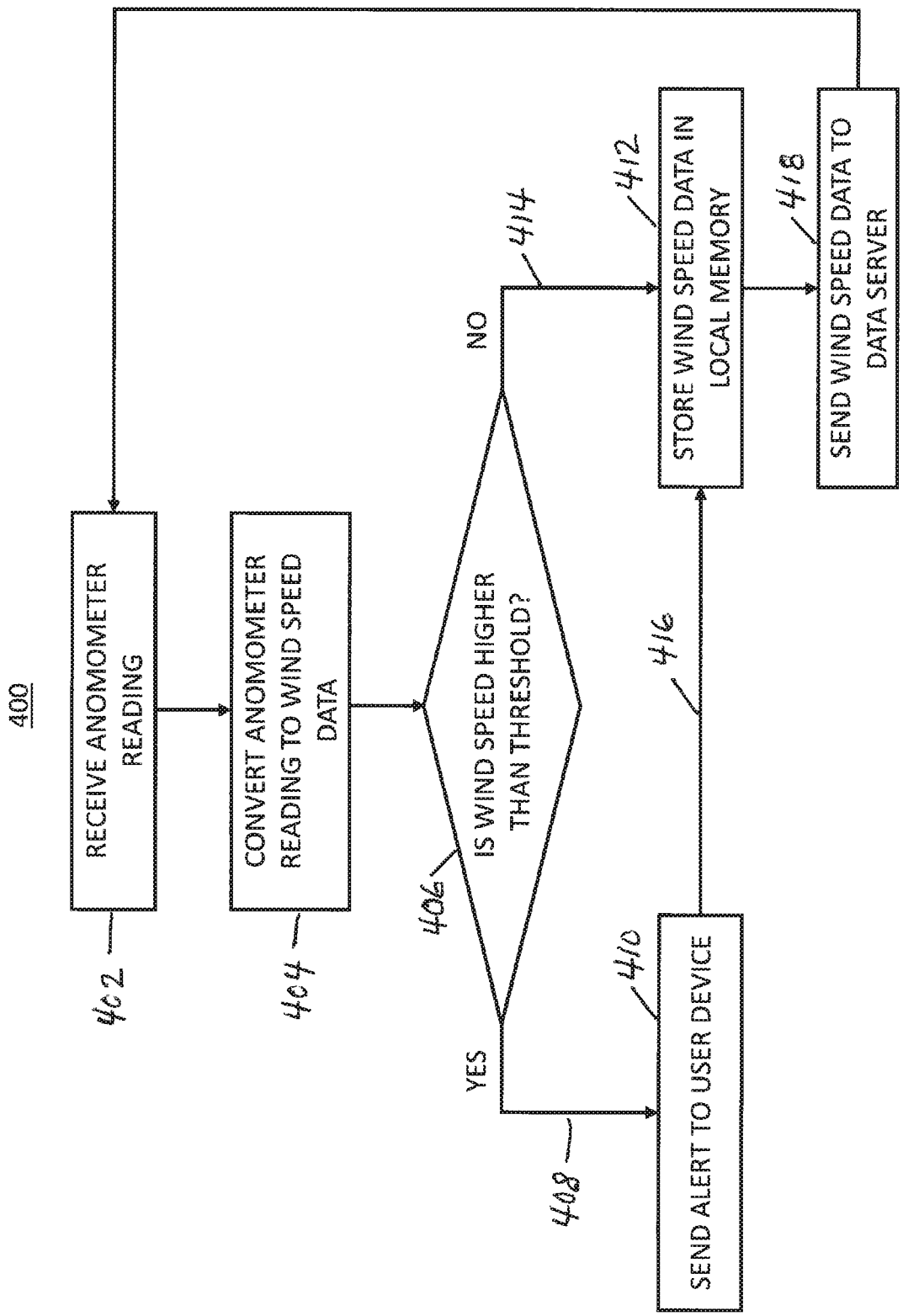
FIG. 4 shows an example of a process for managing wind speed data in accordance with some embodiments of the disclosed subject matter.

Referring now to FIG. 4, there is illustrated an example of a process 400 for managing wind speed data in accordance with some embodiments of the disclosed subject matter. In FIG. 4, the example process 400 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the process 400 can be executed by any device or combination of devices. For example, the process 400 can be executed at least in part by one or more data servers (e.g. the data server 202 of FIG. 2), one or more user devices (e.g., the user device 204 of FIG. 2), one or more wind stations (e.g., the wind stations 209 of FIG. 2 and/or wind station system 100 of FIG. 1), one or more certification servers (e.g., the certification server 206 of FIG. 2) and/or any other suitable device.

The wind speed data managing process 400 can begin at block 402 having steps of receiving an anemometer reading. In some embodiments, receiving step 402 can receive an anemometer reading in any suitable format. For example, the step 402 can receive an electrical signal from the anemometer 104. As a more particular example, the electrical signal can be an AC sine wave. In such a more particular example, the frequency of the AC sine wave can be proportional to the wind speed. In some embodiments, the anemometer reading can be a continuous reading. In some other embodiments, the anemometer reading can be an instantaneous reading or a plurality of instantaneous readings.

In some embodiments, the process 400 can include a block 404 having steps wherein the anemometer reading is converted to wind speed data. In some embodiments, the steps of block 404 follow the steps of block 402. In some embodiments, the converting step 404 can convert the anemometer reading to wind speed data using any suitable technique or combination of techniques and any suitable information. For example, if the received anemometer reading is an AC sine wave with a frequency proportional to wind speed, the steps of block 404 can apply a predetermined multiplier to the frequency to calculate the wind speed.

In some embodiments, the process 400 can convert an anemometer reading (or a plurality of anemometer readings) over a predetermined period of time to an average wind speed. For example, the process 400 can receive (e.g., in block 402) an anemometer reading or readings over a thirty second period, a one minute period or any other suitable amount of time and convert (e.g., in block 404) the anemometer reading or readings over that period to an average wind speed. Thus, in some embodiments, the block 402 or 404 can further include steps of storing multiple anemometer readings received at intervals over a predetermined period of time. In some embodiments, the block 404 can further include steps of converting multiple anemometer readings into an average wind speed.

In some embodiments, the steps of block 404 can include steps of converting an anemometer reading over a first predetermined period of time to a maximum wind speed during a second, shorter, predetermined time period that is within the first predetermined period of time (referred to sometimes herein as a "peak gust"). For example, if the received anemometer reading in block 402 is an AC sine wave with a frequency proportional to wind speed, the block 404 can include determining the frequency of the wave over a ten-minute base period, and calculating a moving average of the frequency over each three-second period, and finding a maximum three-second average wind speed by applying a predetermined multiplier to the maximum three-second moving average frequency. In other embodiments, any values for the first predetermined time period (i.e., "the base period") and the second predetermined time period (i.e., "the moving average period") can be used.

In some embodiments, the process 400 can include a block 406 having steps of determining whether the wind speed data is higher than a predetermined threshold. In some embodiments, the block 406 follows block 404. For example, if the steps in block 404 convert the anemometer reading to a peak gust, the steps in block 406 can determine whether the peak gust exceeds a predetermined threshold peak gust. As another example, if the steps in block 404 convert the anemometer reading to an average wind speed, the steps in block 406 can determine whether the average wind speed exceeds a predetermined threshold wind speed.

In some embodiments of the process 400, in the event that the wind speed exceeds a predetermined threshold, the steps in block 406 can proceed (as denoted by arrow 408 in FIG. 4) to block 410 including steps of sending an alert to be sent to a user device 204. In some embodiments, steps of block 410 can cause an alert to be sent to a user device 204 using any technique or combination of techniques. For example, if the user device 204 is a mobile phone, the steps of block 410 can cause a text message to be sent to the user device. As another example, if the user device 204 is a personal computer, the steps of block 410 can send an alert via e-mail. As yet another example, the steps of block 410 can cause an alert to be posted to a Web site.

In some embodiments, the steps of block 410 can send an alert to a user device 204 using any suitable communication network. For example, the steps of block 410 can send an alert using the communication network 210 shown in FIG. 2 and described in connection with the computer hardware 200.

In some embodiments, the process 400 includes a block 412 having steps of storing wind speed in local memory. In some embodiments, the steps of block 412 can either follow the steps of block 406 directly (as denoted by arrow 414 in FIG. 4) or via the steps of block 410 (as denoted by arrows 408 and 416 in FIG. 4). In some embodiments, any suitable local memory can be used. For example, the steps of block 412 can store wind speed data in the local memory 130 of the storage device 118 as shown in FIG. 1 and described in connection with wind station system 100.

In some embodiments, the steps of block 412 can store wind speed data in local memory in any suitable format. For example, the steps of block 412 can store the wind speed data in an XML format, JSON format, CSV format, and/or any other suitable data format.

In some embodiments, the steps of block 412 can store any amount of wind speed data in local memory. For example, in some embodiments the steps of block 412 can store days, months, or years of wind speed data in local memory.

In some embodiments, the process 400 includes a block 418 having steps of sending wind speed data to a data server. In some embodiments, the steps of block 418 follow the steps of block 412. In some embodiments, the steps of block 412 can send wind speed data to a data server using any suitable communication network. For example, the steps of block 412 can send wind speed data to a data server 202 using the communication network 210 shown in FIG. 2 and described in connection with the hardware 200.

Figure 5:
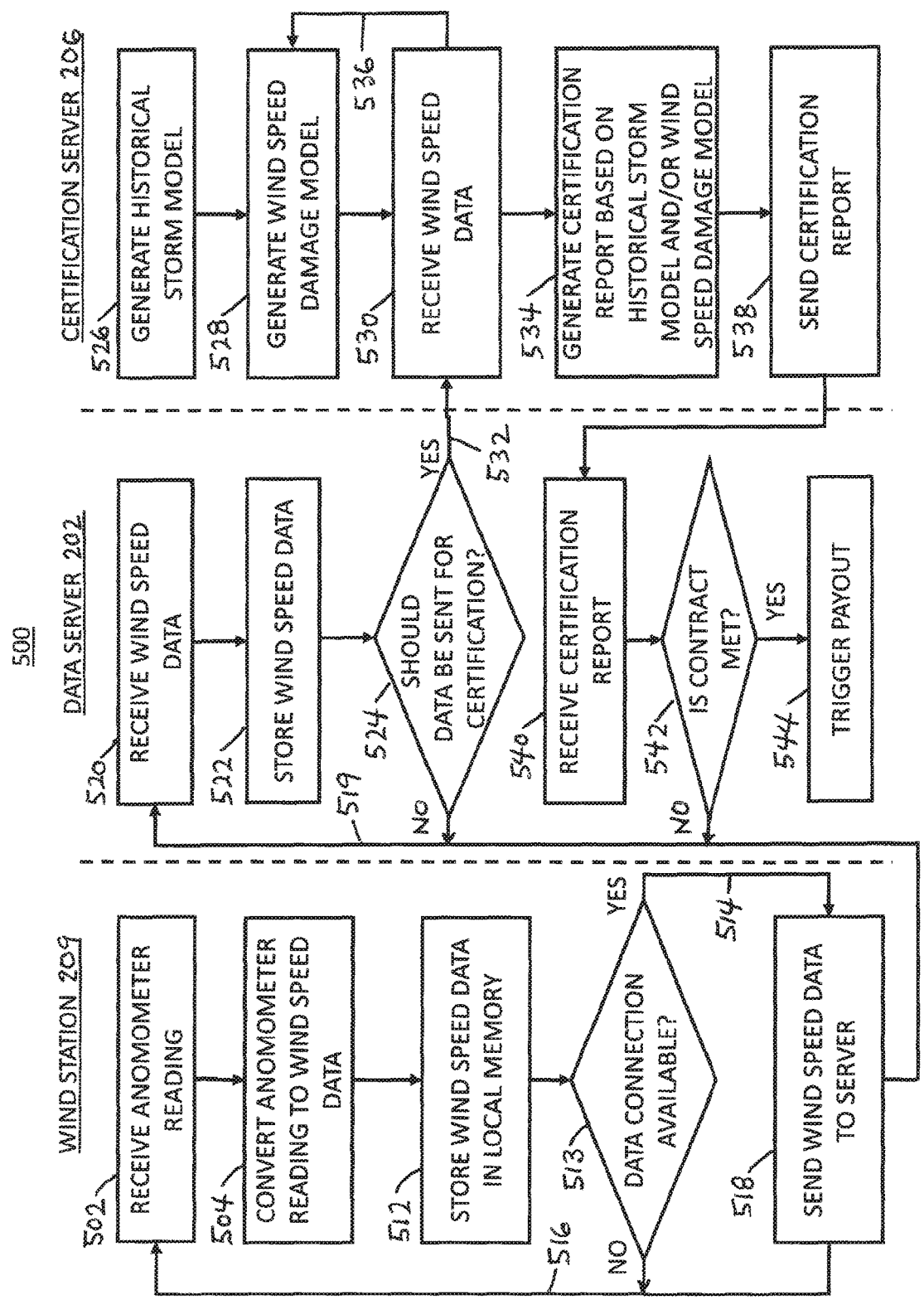
FIG. 5 shows an example of a process for managing wind speed data including triggering wind speed payouts based on wind speed data in accordance with some embodiments of the disclosed subject matter.

Referring now to FIG. 5, there is illustrated an example of a process 500 for triggering wind speed payouts based on wind speed data in accordance with some embodiments of the disclosed subject matter. In FIG. 5, the example process 500 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the triggering process 500 can be executed by any device or combination of devices. For example, the process 500 can be executed at least in part by one or more data servers (e.g. the data server 202 of FIG. 2), one or more user devices (e.g., the user device 204 of FIG. 2), one or more wind stations (e.g., the wind station 209 of FIG. 2 and/or wind station system 100 of FIG. 1), one or more certification servers (e.g., the certification server 206 of FIG. 2), and/or any other suitable device.

In some embodiments, the trigging process 500 can begin at a block 502 having steps of receiving an anemometer reading at a wind meter. In some embodiments, the steps of block 502 can receive an anemometer reading using any suitable techniques or combination of techniques. For example, the steps of block 502 can receive an anemometer reading as described above for block 402 with reference to FIG. 4.

In some embodiments, the triggering process 500 includes a block 504 having steps of converting an anemometer reading into wind speed data. In some embodiments, the steps of block 504 follow the steps of block 502. In some embodiments, the steps of block 504 can convert an anemometer reading into wind speed data using any suitable techniques or combination of techniques and any suitable information. For example, the steps of block 504 can convert an anemometer reading into wind speed data as described above for block 404 with reference to FIG. 4.

In some embodiments, the triggering process 500 includes a block 512 having steps of storing wind speed data in a local memory of a wind station. In some embodiments, the steps of block 512 follow the steps of block 504. In some embodiments, the steps of block 512 can store wind speed data in a local memory of a wind station using any suitable techniques or combination of techniques. For example, the steps of block 512 can store wind speed data in the local memory of a wind station 209 as described above for block 412 with reference to FIG. 4, or in the local memory 130 of a storage device 118 of a wind station system 100 as described above with reference to FIG. 1.

In some embodiments, the triggering process 500 includes a block 513 having steps of determining whether a data connection is available. In some embodiments, the steps of block 513 can follow the steps of block 512. The steps of block 513 can determine whether a data connection is available using any suitable techniques or combination of techniques and any suitable information. For example, the steps of block 513 can determine whether a data connection is available by pinging a server, sending a test data packet, querying a server and/or any other suitable technique or combination of techniques.

If the steps of block 513 determine that a data connection is available, the process 500 can continue to block 518 (as denoted by arrow 514 in FIG. 5) having steps of sending wind speed data to a server. In some embodiments, the steps of block 518 can send wind speed data to a server using any suitable techniques or combination of techniques. For example, the steps of block 518 can send wind speed data to a server (e.g., the data server 202 and/or certification server 206 of FIG. 2) as described above for block 418 with reference to FIG. 4. If the steps of block 513 determine that a data connection is not available, the process 500 can continue by repeating an earlier part of the process (e.g., as denoted by arrow 516 in FIG. 5).

In some embodiments, the triggering process 500 includes a block 520 having steps of receiving wind speed data at a data server (e.g., the data server 202 of FIG. 2). In some embodiments, the steps of block 520 follow the steps of block 518 (as denoted by arrow 519 in FIG. 5). In some embodiments, the steps of block 520 can receive wind speed data using any suitable techniques or combination of techniques. For example, the steps of block 520 can receive the wind speed data via a communication network (e.g., the communication network 210 of FIG. 2).

In some embodiments, the triggering process 500 includes a block 522 having steps of storing wind speed data. In some embodiments, the steps of block 522 follow the steps of block 520. In some embodiments, the steps of block 522 can store wind speed data using any suitable techniques or combination of techniques. For example, the steps of block 522 can store wind speed data on a memory and/or storage (e.g., the memory and/or storage 304 of FIG. 3).

In some embodiments, the triggering process 500 includes a block 524 having steps of determining whether wind speed data should be sent for certification. In some embodiments, the steps of block 524 can follow the steps of block 522. In some embodiments, the steps of block 524 can determine whether wind speed data should be sent for certification using any suitable techniques or combination of techniques and any suitable information. For example, the steps of block 524 can determine whether wind speed data should be sent for certification based on whether the wind speed data is related to a named storm (e.g., a named hurricane or typhoon). As a more particular example, if the wind speed data is gathered from a location and time period associated with a storm that has been named by a weather organization (e.g., the National Weather Service), the steps of block 524 can determine that the wind speed data should be sent for certification. As another example, the steps of block 524 can determine whether wind speed data should be sent for certification based on a threshold wind speed. As a more particular example, if the wind speed data includes a wind speed that is higher than a predetermined threshold wind speed, the steps of block 524 can determine that the wind speed data should be sent for certification. If the steps of block 524 determine that the wind speed data does not need to be certified, the process 500 can continue by repeating an earlier part of the process (e.g., as denoted by arrow 519 in FIG. 5).

In some embodiments, the triggering process 500 includes a block 526 having steps of generating a historical storm model. In some embodiments, the steps of block 526 can generate a historical storm model using any suitable technique or combination of techniques and any suitable information.

In some embodiments, the steps of block 526 can generate a historical storm model using any suitable historical storm data. For example, the steps of block 526 can use data cataloging the frequency and severity of storms along the United States coastline over a certain period. As a more particular example, the steps of block 526 can use a storm dataset that records the time, date, latitude, longitude, maximum sustained wind speed, and central pressure for storms from the year 1900 through 2012. In other embodiments, the steps of block 526 can use a storm dataset for storms from the year 1900 through the most recent year for which storm data is available. In still other embodiments, the steps of block 526 can use a storm dataset for storms from a predetermined first year agreed-to under a contract through a predetermined final year agreed-to under the contract.

In some embodiments, the steps of block 526 can further include supplementing historical storm data by generating synthetic storms and/or generating a historical storm model based at least in part on the synthetic storms. For example, the process 500 and/or the steps of block 526 can generate synthetic storms by utilizing the bogusing technique of Kurihara et at, "An Initialization Scheme of Hurricane Models by Vortex Specification," Monthly Weather Review, vol. 2, July 1993, the content of which is incorporated herein by reference.

In some embodiments, the triggering process 500 includes a block 528 having steps of generating a wind speed damage model based on a historical storm model. In some embodiments, the steps of block 528 can follow the steps of block 526, and the historical storm model can be the historical storm model generated by the steps of block 526. In some embodiments, the steps of block 528 can generate a wind speed damage model based on the historical storm model using any suitable techniques or combination of techniques and any suitable information.

In some embodiments, the steps of block 528 can generate a wind speed damage model by simulating wind gusts based on the historical storm model. For example, the steps of block 528 can simulate peak gusts in the historical storm model and associate the simulated peak gusts with historical damage information.

In some embodiments, the triggering process 500 includes a block 530 having steps of receiving wind speed data if the process determines (e.g., from the steps of block 524) that that wind speed data should be sent for certification (i.e., as denoted by arrow 532 in FIG. 5). In some embodiments, the steps of block 530 can receive wind speed data using any suitable technique or combination of techniques. For example, the steps of block 530 can receive wind speed data via a communication network (e.g., the communication network 210 of FIG. 2) from a wind station, such as wind station system 100, as described above. As another example, the steps of block 530 can receive wind speed data via a communication network (e.g., the communication network 210 of FIG. 2) from a data server (e.g., the data server 202 of FIG. 2).

In some embodiments, the triggering process 500 includes a block 534 having steps of generating a certification report for the received wind speed data based on the historical storm model, and/or the wind speed damage model. In some embodiments, the steps of block 534 can follow the steps of block 530. In some embodiments, the steps of block 534 can generate a certification report for the received wind speed data based on the historical storm model (e.g., from block 526) and/or the wind speed damage model (e.g., from block 528) using any suitable technique or combination of techniques and any additional suitable information. For example, in some embodiments, the process 500 and the steps of block 534 can generate a certification report by inputting (as denoted by arrow 536 in FIG. 5) the received wind speed data in addition to information related to buildings in an area related to the wind speed data (e.g., construction class of the buildings, building height, building occupancy, year of construction, and/or floor area) into the wind speed damage model. As a more particular example, if the wind speed data is within a predetermined number of standard deviations from a wind speed predicted by the model, the steps of block 534 can generate a certification report that certifies the wind speed data. As another example, the steps of block 534 can generate a certification report by comparing the received wind speed data (e.g., from block 530) with a wind speed predicted by the historical storm model (e.g., from block 526). As yet another example, the steps of block 534 can generate a certification report based on wind speed data received from a third party.

In some embodiments, the triggering process 500 includes a block 538 having steps of sending the certification report. In some embodiments, the steps of block 538 can follow the steps of block 534. In some embodiments, the steps of block 538 can send the certification report using any suitable techniques or combination of techniques. For example, the steps of block 538 can send the certification report to a data server (e.g., the data server 202 of FIG. 2) via a communication network (e.g., the communication network 210 of FIG. 2). The triggering process 500 may further include a block 540 having steps of receiving the certification report sent by the steps of block 538. In some embodiments, the steps of block 540 can receive the certification report using any suitable techniques or combination of techniques. For example, the steps of block 540 can receive the certification report from a communication network (e.g., the communication network 210 of FIG. 2) using a data server (e.g., the data server 202 of FIG. 2).

In some embodiments, the triggering process 500 includes a block 542 having steps of determining if a contract has been met. In some embodiments, the steps of block 542 can follow the steps of block 540. In some embodiments, the steps of block 542 can determine if a contract has been met using any suitable techniques or combination of techniques and/or any suitable information. For example, the steps of block 542 can determine if a contract has been met based on the received certification report, e.g., the certification report received from block 540. For example, the steps of block 542 can determine that a wind speed contained in wind speed data is greater than a threshold amount contained in a contract and that the certification report certifies that such a wind speed is correct, and accordingly determine that the contract has been met. As another example, the steps of block 542 can determine that a wind speed contained in wind speed data is greater than a threshold amount contained in a contract, and that the certification report does not certify that such a wind speed is correct, and accordingly determine that the contract has not been met.

In some embodiments, the steps of block 542 can determine if a contract has been met by submitting the wind speed data and certification report for manual review. For example, if the steps of block 542 determine that wind speed data includes a wind speed that is higher than a threshold wind speed contained in a contract, and that the certification report certifies that the wind speed data is correct, the steps of block 542 can then submit the wind speed data and the certification report for manual review.

In some embodiments, the triggering process 500 includes a block 544 having the steps of triggering a payout of a contract. In some embodiments, the steps of block 544 can follow the steps of block 542 if the steps of block 542 determined that the contract was met. In some embodiments, the steps of block 542 can trigger a payout of the contract using any suitable technique or combination of techniques. For example, the steps of block 542 can trigger a payout of the contract by sending information to a contract payout server (e.g., the contract payout server 208 of FIG. 2). As another example, the steps of block 542 can trigger a payout by processing an electronic transaction such as a bank deposit, an electronic funds transfer, a direct deposit, sending a digital currency and/or any other suitable electronic transaction.

In some embodiments, at least some of the above-described blocks and/or steps of the processes of FIGS. 4 and 5 can be executed or performed in any order or sequence not limited to the order and sequence shown in and described in connection with the figures. Also, some of the above blocks and/or steps of FIGS. 4 and 5 can be executed or performed substantially simultaneously where appropriate or in parallel to reduce latency and processing times. Additionally or alternatively, some of the above described blocks and/or steps of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, nontransitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A system for collecting and managing wind speed data via an external communications network, the system comprising:
   one or more wind station, each respective wind station being disposed at a respective wind station location and including, respectively,
      an anemometer disposed at the respective wind station location and producing wind speed signals indicative of wind speeds at the respective wind station location;
      a station computing device disposed at the respective wind station location and operatively connected to the anemometer for receiving the wind speed signals and producing wind speed data corresponding to the wind speed signals;
      a station memory disposed at the respective wind station location and operatively connected to the station computing device for storing the wind speed data; and
      a station communication interface disposed at the respective wind station location, the station communication interface being operatively connected to the station computing device to receive wind speed data therefrom, and being operatively connected to an external communication network to the transmit wind speed data to the external communications network;
   one or more data server, each respective data server being disposed at a respective data server location and including, respectively,
      a server computing device disposed at the respective data server location;
      a server communication interface disposed at the respective data server location, the server communication interface being operatively connected to the external communication network to receive respective wind speed data from the one or more wind stations and operatively connected to the server computing device to provide the received respective wind speed data to the server computing device; and
      a server memory disposed at the respective data server location and operatively connected to the server computing device for storing the received respective wind speed data; and
      wherein the one or more data server can transmit the stored received respective wind speed data to another location on the external communications network;
   further comprising:
   one or more certification server, each respective certification server being disposed at a respective certification server location and including, respectively,
      a certification server computing device disposed at the respective certification server location; and
      a certification server communication interface disposed at the respective certification server location, the certification server communication interface being operatively connected to the external communication network to receive respective wind speed data from the one or more data servers and operatively connected to the certification server computing device to provide the received respective wind speed data to the certification server computing device; and
   wherein each of the one or more certification server can generate a respective data model, the respective data model comprising at least one of
      a historical storm model and
      a wind speed damage model;
   wherein each of the one or more certification server can generate a respective certification report based on the received respective wind speed data and the generated respective data models; and
   wherein the one or more certification server can transmit the generated respective certification report to another location on the external communications network; and
   further comprising:
   one or more payout server, each respective payout server being disposed at a respective payout server location and including, respectively,
      a payout server computing device disposed at the respective payout server location; and
      a payout server communication interface disposed at the respective payout server location, the payout server communication interface being operatively connected to the external communication network to receive the respective certification reports from the one or more certification server and to provide the received respective certification reports to the payout server computing device; and
   wherein each of the one or more payout server can determine if a received respective certification report satisfied the terms of a respective associated contract.

2. A system for collecting and managing wind speed data via an external communications network in accordance with claim 1, wherein
   the one or more wind station are further adapted to store a plurality of respective individual anemometer readings in the respective station memory over a predetermined time period,
   to convert the plurality the respective individual anemometer readings over the predetermined time period into a respective average wind speed for the predetermined time period, and
   to transmit the respective average wind speed for the predetermined time period to the one or more data server over the external communications network.

3. A system for collecting and managing wind speed data via an external communications network in accordance with claim 1, wherein the one or more wind station are further adapted to store a plurality of respective individual anemometer readings in the respective station memory over a predetermined time period,
to convert the plurality the respective individual anemometer readings over the predetermined time period into a respective maximum wind speed for the predetermined time period, and
to transmit the respective maximum wind speed for the predetermined time period to the one or more data server over the external communications network.

4. A system for collecting and managing wind speed data via an external communications network in accordance with claim 1, wherein each of the one or more payout server, upon determining that the received respective certification report satisfies the terms of the respective associated contract, triggers a respective payout in accordance with the respective associated contract at another location by communicating over the external communication network.

5. A method for collecting and managing wind speed data, the method comprising:
measuring wind speeds at a one or more geographic location and producing respective wind speed signals indicative of the respective measured wind speeds at each respective one or more geographic location, wherein the respective wind speed signals are one of electric signals and electronic signals;
converting the respective wind speed signals into respective wind speed data at each respective one or more geographic location, wherein the respective wind speed data is digital data;
storing the respective wind speed data at each respective one or more geographic location, wherein the respective wind speed data is stored in a digital data format;
transmitting the respective stored wind speed data at each respective one or more geographic location as digital data onto an external communications network;
receiving, at one or more data server, the respective wind speed data as digital data for the respective one or more geographic location from the external communication network;
storing the received respective wind speed data for the respective one or more geographic location on the one or more data server;
determining, at the one or more data server, if the respective one or more wind speed data for each of the respective one or more geographic location are to be sent for certification; and
when it is determined that the one or more respective wind speed data for the respective one or more geographic location are to be sent for certification,
transmitting the respective one or more wind speed data for the respective one or more geographic location as digital data onto an external communications network, and
receiving, at one or more certification server, the respective wind speed data for the respective one or more geographic location as digital data from the external communication network;

further comprising:
generating, in response to receiving at the one or more certification server the respective wind speed data for the respective one or more geographic location from the external communication network, at least one of
a historical storm model and
a wind speed damage model;
generating a certification report for the respective one or more geographic location based on both
the respective wind speed data for the respective one or more geographic location and
the at least one of generated historical storm model and wind speed damage model; and
transmitting the certification report for the respective one or more geographic location as digital data onto the external communications network; and further comprising:
determining, in response to receiving the certification report for the respective one or more geographic location from the external communication network, whether the terms of an associated contract are satisfied;
when it is determined in response to receiving the certification report that the terms of an associated contract are satisfied, triggering a payout in accordance with the associated contract by communicating digital data onto the external communications network.

6. A method for collecting and managing wind speed data in accordance with claim 5, further comprising:
storing a plurality of the respective wind speed data for a particular one of the one or more geographic location over a predetermined time period,
converting the stored plurality of the respective wind speed data for the particular one of the one or more geographic location over the predetermined time period into at least one of
an average wind speed for the predetermined time period at the particular one of the one or more geographic location, and
a maximum wind speed for the predetermined time period at the particular one of the one or more geographic location, and
determining, for the predetermined time period at the particular one of the one or more geographic locations, if the respective average wind speed or maximum wind speed exceeds a predetermined threshold for the respective average wind speed or maximum wind speed, and
when it is determined that the respective average wind speed or maximum wind speed exceeded a predetermined threshold for the respective average wind speed or maximum wind speed, transmitting and alert signal as digital data to a user device using the external communications network.

* * * * *